Sept. 15, 1942.　　　A. M. BOLDT　　　2,296,085
TRUCK LOADING DEVICE
Filed April 17, 1940　　　3 Sheets-Sheet 1
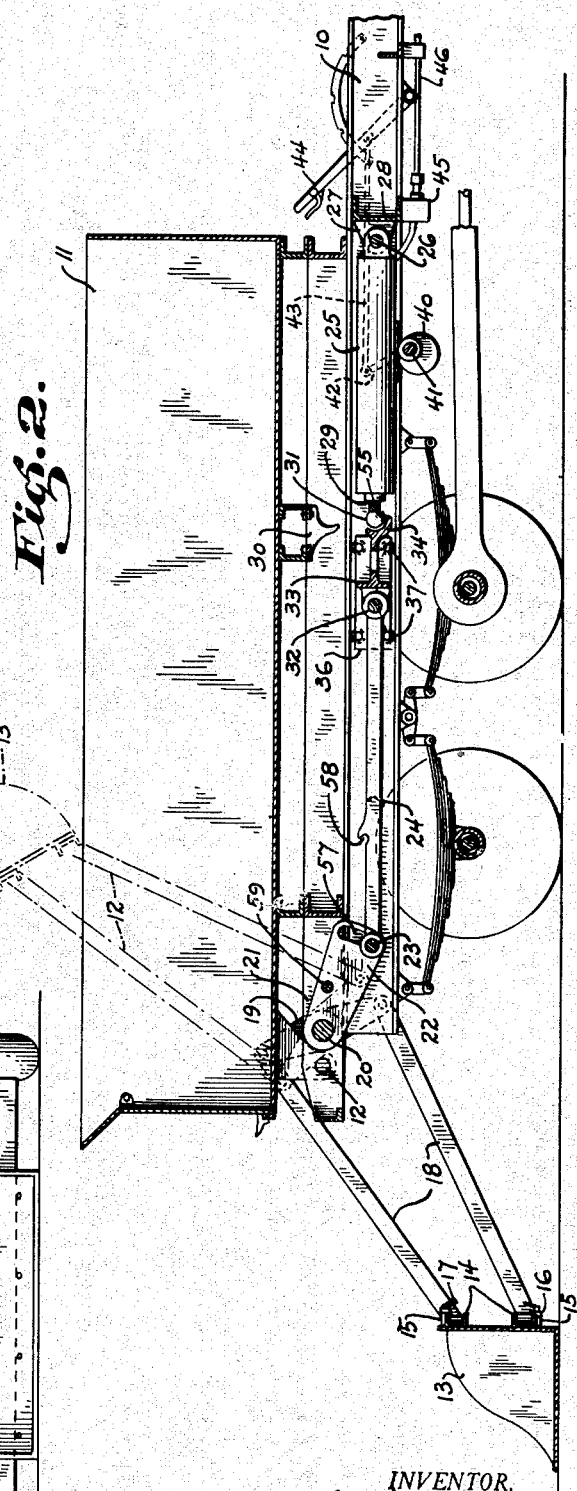
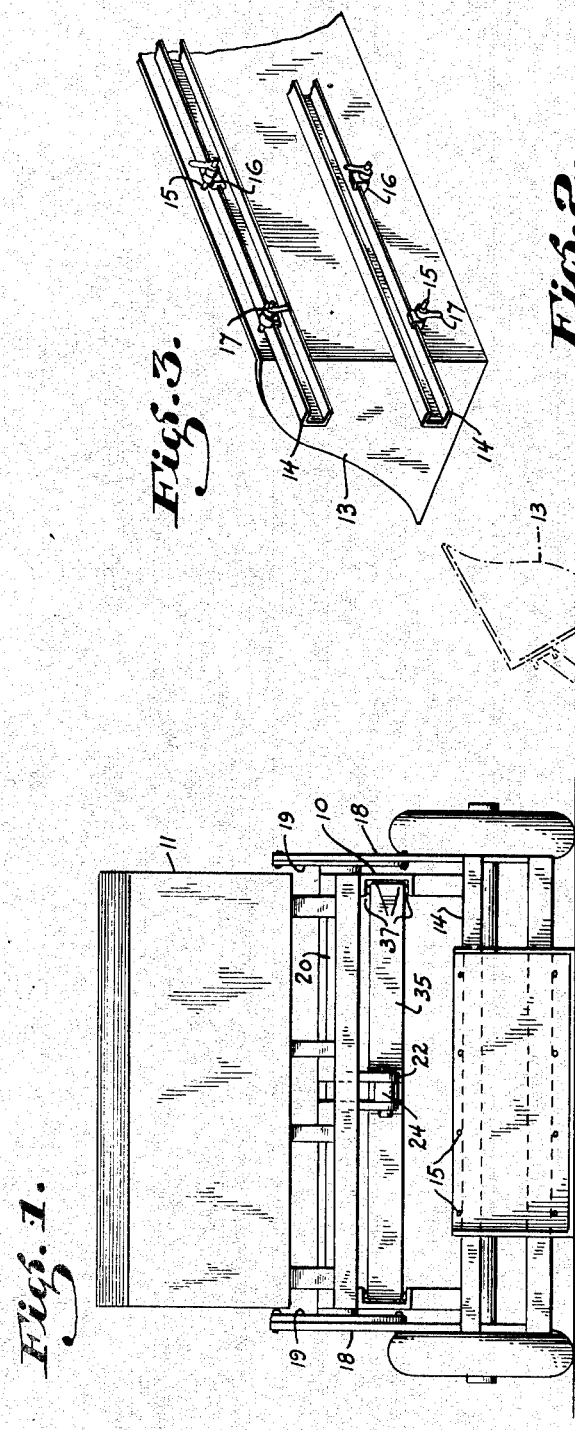
INVENTOR.
Alvin M. Boldt.
BY
Chas. E. Townsend.
ATTORNEY.

Sept. 15, 1942.    A. M. BOLDT    2,296,085
TRUCK LOADING DEVICE
Filed April 17, 1940    3 Sheets-Sheet 2
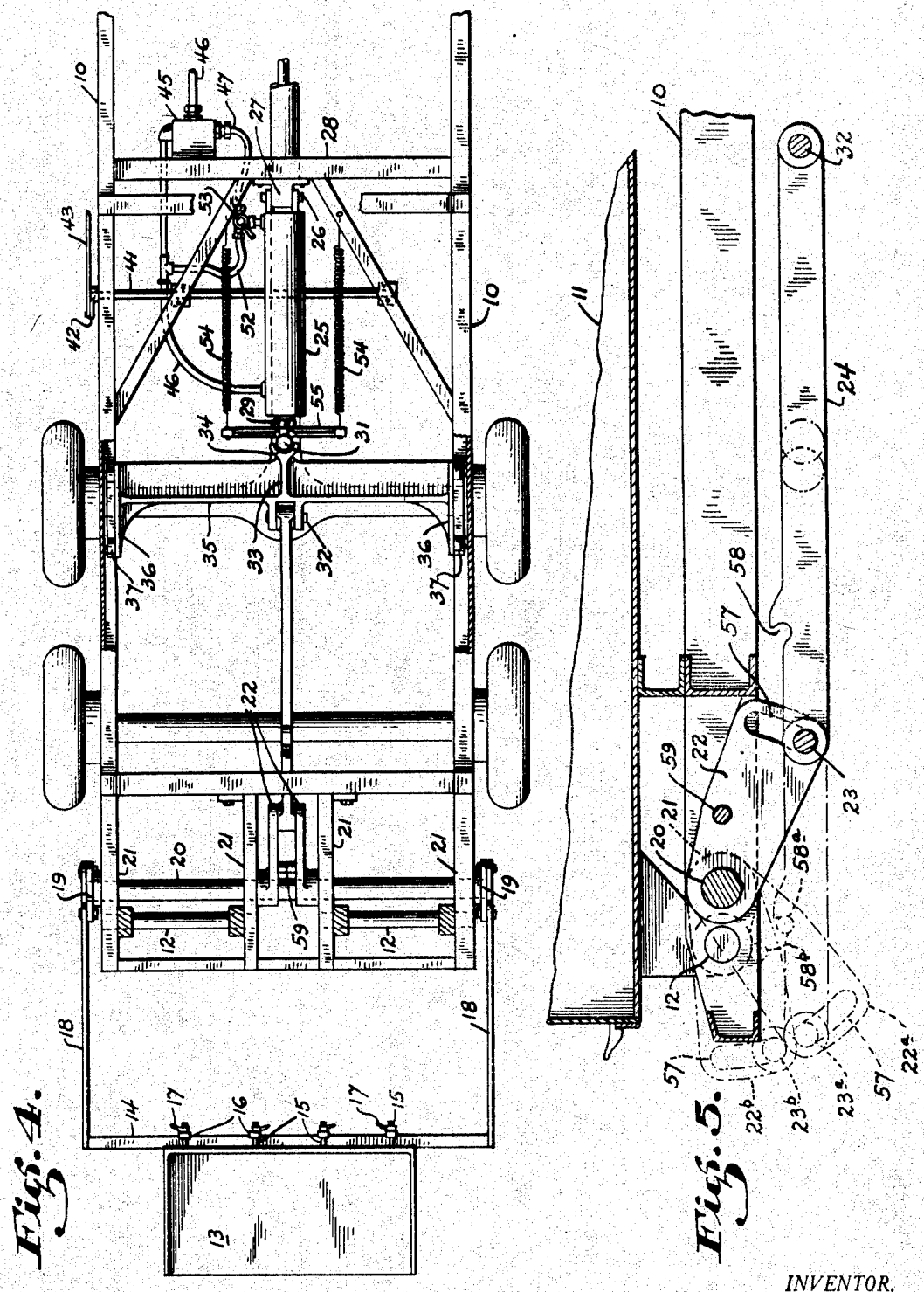
INVENTOR.
Alvin M. Boldt.
BY
Chas. E. Townsend.
ATTORNEY.

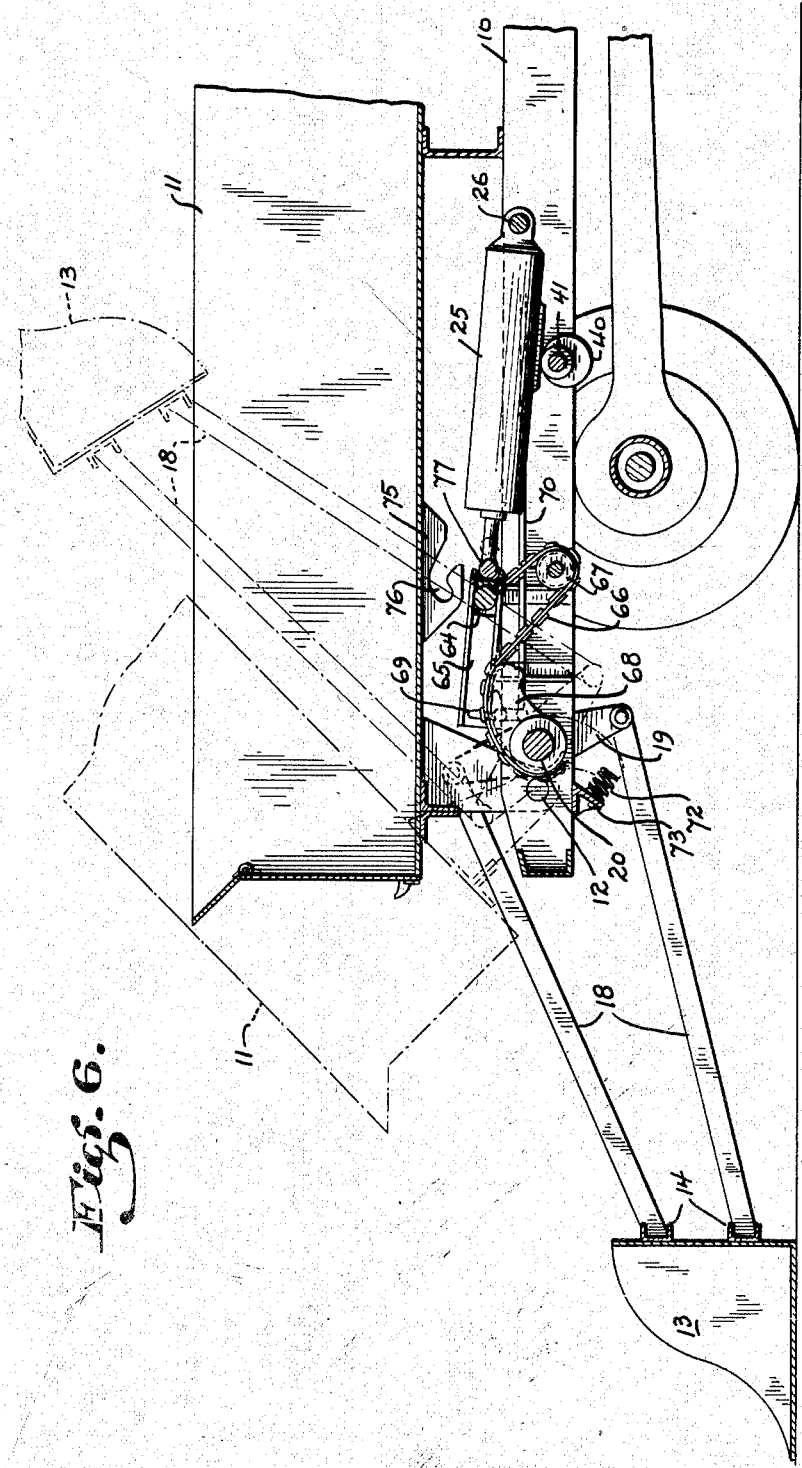

Patented Sept. 15, 1942

2,296,085

UNITED STATES PATENT OFFICE 2,296,085

TRUCK LOADING DEVICE

Alvin M. Boldt, Vallejo, Calif.

Application April 17, 1940, Serial No. 330,102

7 Claims. (Cl. 214—78)

The present invention relates to truck loading devices and particularly to a device designed for use in connection with dump trucks and the like and operable entirely through power provided by the truck for picking up material from the ground and loading it on to the truck.

The invention embodies a scoop-like member pivoted to the chassis of a truck to swing from the position adjacent the ground to a position in which its contents will be dropped into the body of the truck, this member acting in the manner of a shovel or scraper so that as the truck is backed toward a pile of material with the scoop in its lowered position, the scoop will pick up a load of said material and, upon raising of the scoop about its pivotal connection with the truck chassis, the material will be deposited in the body of the truck.

It is the object of the present invention to provide a truck loading device of the kind described particularly adapted for use on a dump truck provided with power means for moving the body to its dumping position, the loading device being capable of operation by the same power means through the medium of a very simple mechanism whereby a truck embodying both loading and dumping features may be constructed at low cost, and whereby a conventional dump truck may be inexpensively converted to a truck having automatic loading as well as dumping features.

A further object of the invention is the provision in a truck of a novel power mechanism for selectively operating a dump body and a loading device.

A further object of the invention is the provision in connection with a loading device on a truck of novel means for connecting a power unit to the loading device for effecting swinging movement of the loading device through a long arc from its position adjacent the ground to a position above the truck body by a relatively short reciprocal movement effected by the power unit.

A still further object of the invention is the provision, in combination with a device for loading trucks, of power means for operating said loading device and means associated with the power means to prevent damage to the device by overloading.

Further objects and advantages of the invention will be made apparent in the following specification, wherein reference is made to the accompanying drawings, showing one form of the invention for purposes of illustration.

In the drawings—

Fig. 1 is a rear elevation of a dump truck and loading device embodying the present invention;

Fig. 2 is a longitudinal section of the rear portion of the truck shown in Fig. 1, showing mechanism for elevating the dump body of the truck and operating the loading device;

Fig. 3 is a fragmentary perspective view showing details of the connection of the scoop shown in Figs. 1 and 2 with the arms which control it;

Fig. 4 is a plan view of the rear end of the truck shown in Fig. 2 with the dump body removed and with parts broken away to illustrate details of construction of the loading device operating mechanism;

Fig. 5 is an enlarged detail view in longitudinal section illustrating one form of connection between the loading device and operating mechanism therefor;

Fig. 6 is a longitudinal section of the rear portion of a truck illustrating a modified form of connection between the loading device and its operating mechanism, and other preferred features; and Fig. 7 is a view similar to Fig. 6 with parts removed and illustrating a further modification.

Referring to Figs. 1, 2 and 4, the invention is shown as applied to a conventional truck which includes the usual chassis 10 and dump body 11. The body 11 is pivoted adjacent its lower rear edge to the chassis by means of a transversely extending bar 12 about which it may be tipped in the usual manner to effect discharge of its contents. A loading device, to be used in loading the body 11, is shown as comprising a scoop 13 secured to a pair of transversely extending channel-shaped beams 14 by means of bolts 15, lugs 16, and wing nuts, or the like, 17. This type of connection between the scoop 13 and beams 14 permits ready adjustment of the scoop transversely of the truck for a purpose which will hereinafter appear. The beams 14 are supported at the outer ends of two pairs of arms 18, the inner ends of which arms are secured to the opposite ends of levers 19, which are fixed at their centers to the ends of a transverse shaft 20, journaled for rotational movement in bearing brackets 21 which extend rearwardly from opposite sides of the chassis 10.

In order to rotate the shaft 20 and thus raise the scoop 13 from its lowermost position shown in Fig. 2 to its uppermost position, as indicated in dotted lines in the same figure, a crank arm 22 is fixed centrally of the shaft and extends rearwardly for pivotal connection, as at 23, with a connecting rod 24 which is adapted to be advanced longitudinally by a hydraulic ram 25. Longitudinal movement of the connecting rod 24 toward the rear will swing the crank arm 22 rearwardly and effect rotation of the shaft 20 to raise the scoop 13 from the ground to a position overlying the truck body.

The ram 25 is of the conventional type in general use for raising the body of dump trucks. The ram comprises a cylinder disposed in a generally horizontal position beneath the body of the truck and pivoted at its forward end as by a pin 26 which passes through a bearing bracket 27 which may be positioned on a cross member 28 of the chassis. A reciprocable piston is disposed within the cylinder 25 and a piston rod 29 connected with the piston projects through one end of the cylinder for sliding movement to and from the cylinder upon reciprocation of the piston. The outer end of the piston rod 29 is, in the conventional dump truck, pivotally connected to the bottom of the truck body, so that upon admission of fluid to the cylinder 25, which effects ejection of the piston rod 29, the body is raised or tilted about its pivotal connection 12 with the chassis.

In the present invention, a socket 30 is secured to the bottom of the truck body, and the end of the piston rod 29 is rounded or provided with a fitting such as shown at 31, of spherical or other suitable shape, for engagement in the socket 30 when the ram 25 is swung upwardly about its pivotal support 29. In order that the piston rod 29 may also function to move the connecting rod 24 rearwardly and operate the scoop 13, the inner end of the connecting rod is pivoted as by a pin 32 to a fitting 33 in a socket 34 in a position for engagement by the fitting 31 on the end of the piston rod 29 when the ram 25 is in its lowermost position. The fitting 33 is preferably supported on a transverse bar 35, the opposite ends of which are, as shown in Figs. 2 and 4, provided with plates 36 carrying antifriction rollers 37, adapted to travel longitudinally within the channel-shaped side members of the chassis 10. This serves as a guide for the forward end of the connecting rod 24 and serves also to retain the socket 34 in a central position for engagement by the end of the piston rod.

The ram 25 normally rests in its lower position, as shown in full lines in Fig. 2, for engagement with the socket 34, where extension of the piston rod will effect raising of the scoop 13. In order to raise the ram to the dotted line position, a cam 40 is positioned directly below the ram and secured to a shaft 41. A crank arm 42 (see Fig. 4) is secured to the end of the shaft 41 and a rod 43 is secured to the end of the crank arm 42 and extends forwardly to a pivoted hand lever 44, operable to oscillate the crank arm 42 and thus rotate the shaft 41 and cam 40 to cause the cam to engage the under side of the ram and to raise it to a position where, upon being extended, the end of its piston will engage with the socket 30 on the bottom of the truck body and swing the body upwardly to its dumping position. The lever 44 is shown herein as pivoted to one of the side members of the chassis, but it will preferably be disposed in the driver's cab of the truck, in which case an extension of the rod 43 would, of course, be necessary. With the lever 44 positioned in the driver's cab, the driver can, without leaving his seat, effect raising or lowering of the ram 25 for engagement selectively with the socket 30 for operating the dump body and with the socket 34 for operating the scoop.

To extend the piston rod 26 in operation of the dump body or the scoop, liquid under pressure is pumped into the forward end of the ram cylinder by means of a conventional pump 45 driven by a shaft 46 which takes its power from the motor of the truck, not shown. To extend the piston the pump 45 withdraws fluid from the rear end of the ram through a conduit 46 and directs it into the forward end of the ram through a conduit 47. A by-pass 52 is provided between the conduits 46 and 47 and is normally closed by a three way cock 53, which in one position establishes communication between the ram and the pump, and in its other position closes the line from the ram and opens the by-pass 52. Thus in one position of the cock 52 the pump operates the ram while in its other position the ram remains stationary while the fluid is circulated through the by-pass. Springs 54 are connected between a cross arm 55 on the piston rod and rigid chassis members, and normally tend to retract the piston.

The length of the piston rod 29 is necessarily limited and, as it is desirable to swing the scoop 13 from its position on the ground through a long arc which will place it well over the body of the truck for discharging its contents through the reciprocal action of the piston, the present invention provides a connection shown in detail in Fig. 5 for swinging the scoop through a long arc without sacrificing the leverage advantage where it is most needed. As shown in Fig. 5, the connecting rod 24 is connected by means of its pin 23 with an elongated arcuate slot 57 formed in the end of the spaced crank arms 22. The length of the crank arms 22 is sufficient to provide a good leverage during raising of the scoop from its lowermost position to a position approaching the vertical where the effective load being lifted by the ram is materially reduced, but where it is still necessary to swing the scoop through a considerable arc until it reaches its discharge position indicated in dotted lines in Fig. 2. To accomplish this final movement of the scoop, the connecting rod 24 is provided with a notch 58 in its upper edge which, upon reaching the dotted line position shown at 58a in Fig. 5, will engage a pin 59 extending between the crank arms 22. This notch and pin engagement then takes the lifting load of the connecting rod 24 and swings the crank arms 22 to the position indicated in dotted lines at 22b, the notch 58a being correspondingly numbered 58b in this position. During this latter movement the lifting leverage has been reduced, although the movement of the scoop for corresponding movement of the connecting rod has been increased, and the pin 23, shown at 23a and 23b, moves but a short distance while the crank arms 22 are free to move from the position 22a to 22b by virtue of the length of the slot 57.

In operation of the loading device, the scoop 13 may be adjusted transversely of its supporting beams 14 so that it may be employed most efficiently to pick up material piled alongside a ditch or gutter where it is necessary to operate the truck parallel to a pile of material that is to be loaded. With the scoop in its lowered position, the driver backs the truck toward the material to be loaded and when the scoop is full, he operates the ram 25 to extend the piston 29 and raise the scoop to the dotted line position shown in Fig. 2, where its contents will be deposited in the truck body. The scoop will then return by gravity to its lowered position and the truck will again be operated in reverse and the same procedure repeated until the body of the truck is filled.

When it is desired to dump the contents of the body, the lever 44 is manipulated to swing the ram 25 upwardly until the fitting 31 on the end of its piston rod engages with the socket 30 on the bottom of the body. The piston is then again extended to swing the body upwardly about its pivot 12, the weight of the body being sufficient to effect return of the piston.

Referring to Fig. 6, the modified form of connection between the ram and the scoop operating mechanism shown therein is designed particularly for use on certain types of trucks where there is danger of interference between the operating mechanism and the differential housing on the rear axle of the truck. In this modification, the ram is elevated slightly, and the fitting 64 with which the piston engages to raise the scoop is carried in tracks 65 supported above the chassis 10. In this case, the fitting 64 carries a chain 66 which extends over an idler pulley 67 and passes over and is fixed to a curved crank arm 68 which is secured to the shaft 20 which carries the arms that support the scoop 13. The shape of the curved crank arm 68 is such that upon initial movement of the piston in raising the scoop from its lowermost position, the perforation on the shaft 20 is spaced by this crank arm a distance from the center of the shaft which affords an advantage of leverage which is reduced gradually as the scoop approaches its uppermost position.

It is also desirable to insure against the continued operation of the piston after the scoop has reached the limit of its upward movement, in order to prevent unnecessary strain upon all of the scoop lifting mechanism. For this purpose a pivoted lever 69 is provided (shown in Figs. 6 and 7) with a forked upper end projecting between the tracks 65 for engagement by the outer end of the piston rod as it approaches the end of its travel in the tracks 65. When the fitting 64 strikes the upper end of the lever 65, it throws the lower end of said lever forwardly and, through a connecting rod 70, the forward end of which engages the operating handle of the bypass valve 53, moves said valve to the position which opens the by-pass, thus preventing further operation of the ram. Return of the fitting 64 when the scoop is lowered will return the lever and hence the bypass valve to its normal position by virtue of the forked shape of its upper end with which the fitting 64 engages.

It is desirable also that when the scoop reaches its uppermost position, which may be forward of the vertical, as indicated in dotted lines, that some means be employed for insuring its return, at least to a position to the rear of the vertical where it may return to its lowermost position by gravity. For this purpose, a bumper spring 72 is supported on a bracket 73 fixed to the lower surface of the chassis member 10 in a position to be engaged by the outer end of the curved crank arm 68. During the last part of the upward movement of the scoop, the curved crank will engage this spring and compress it to provide sufficient tension to throw the scoop, after its load has been deposited in the body of the truck, back past its vertical position.

In some trucks the dump body when pivoted to its uppermost position is so nearly balanced that its initial return movement is slow, and the return of the piston under influence of the springs, which is relatively rapid, will disengage the end of the piston rod from the socket on the truck body, with the result that the body will be permitted to fall by gravity, which is undesirable and dangerous. To prevent this, a socket 75 is provided on the bottom of the truck body, in place of the socket 30 shown in Fig. 2. The socket 75 comprises identical spaced downwardly extending plates secured to the bottom of the truck body and having offset slots 76 formed therein so that a cross bar 77 on the end of the piston rod will enter said slots upon extension of the piston rod and come to rest in the offset portions thereof. When the truck body is in its uppermost position, these slots which are carried with it are shaped to prevent withdrawal of the bar 77 upon retraction of the piston under influence of the springs. Consequently, the piston cannot be withdrawn from the socket until the body approaches its normal horizontal position.

Another means for retaining the cross bar 77 on the end of the piston rod in engagement with the socket on the bottom of the truck body is shown in Fig. 7, wherein the socket is illustrated at 80 as having a sliding latch pin 81 with a spring 82 normally urging the latch pin inwardly so that, with the cross bar 77 in the socket, the latch pin 81 will lie beneath it and prevent it from falling out. A cable 83 forms a connection between the outer end of the latch pin and a fixed portion of the frame; and when the truck body is in its lower position, this cable engages a saddle 84 in a manner to exert a pull on the latch pin 81, as illustrated in Fig. 7, to retract the pin and permit the cross bar 77 to move freely into and out of the socket 80. When the truck body is swung upwardly, the cable will be raised from the saddle 84 and the latch pin will be permitted to latch the cross bar in the socket, whereby its removal will be positively prevented except when the body is in its lowermost position.

The spring 72 and the socket 75, shown in connection with the form of the invention illustrated in Fig. 6, as well as the latching means illustrated in Fig. 7, are adaptable as well to the form illustrated in the other figures of the drawings, and other variations from the specific structure herein illustrated may be made within the scope of the appended claims.

Having thus described my invention, what I claim and desire to secure by Letters Patent is:

1. In a truck having a pivoted dump body and a pivoted loading scoop, a hydraulic ram, a pivotal support for said ram, and means for adjusting said ram on said support to selectively engage and operate the body and scoop.

2. In a truck having a pivoted dump body and a pivoted loading scoop, means for raising said scoop, a fluid actuated ram pivoted to the chassis of the truck, and means for swinging said ram for selectively engaging and raising the dump body or engaging and operating the scoop raising means.

3. In a truck having a pivoted dump body and a pivoted loading scoop, a fluid actuated ram pivoted to the chassis of the truck, and means including a cam engageable with the ram and a lever for controlling the position of the cam for selectively positioning the ram to actuate the body or the scoop.

4. In a truck having a pivoted dump body and a pivoted loading scoop, a ram with a piston and rod extendable to raise the body or the scoop, a socket arranged on the bottom of the body, a socket associated with the scoop, and means for adjusting the position of the ram to cause the piston rod upon being extended to engage either of said sockets.

5. In a truck having a pivoted dump body and a pivoted loading scoop, a ram with a piston and rod extendable to raise the body or the scoop, a socket arranged on the bottom of the body, a socket associated with the scoop, and means for adjusting the position of the ram to cause the piston rod upon being extended to engage either of said sockets, said socket on the body being shaped to prevent disengagement of the piston rod therefrom while the body is in its raised position.

6. A loading scoop for a truck comprising a scoop member, arms supporting said scoop member and pivoted relative to the truck chassis, means for raising said arms to deposit the contents of the scoop in the body of the truck, and means for adjusting the position of the scoop relative to said arms and transversely of the truck body.

7. A loading scoop for a truck comprising a scoop member supported for pivotal movement relative to the truck chassis, power means on the chassis, and means connecting said power means with the scoop for swinging the scoop upwardly and including a leverage which decreases in length as the scoop approaches a vertical position.

ALVIN M. BOLDT.